United States Patent
Dragan (10) Patent No.: US 12,154,169 B2
(45) Date of Patent: Nov. 26, 2024

(54) SYSTEMS AND METHODS FOR IMPORTING A BATCH OF RECEIVER ACCOUNTS ONTO AN APPLICATION PLATFORM OF A REAL-TIME PAYMENT NETWORK

(71) Applicant: Worldpay, LLC, Symmes Township, OH (US)

(72) Inventor: Manuela Dragan, Westfield, NJ (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 18/061,705

(22) Filed: Dec. 5, 2022

(65) Prior Publication Data

US 2023/0360128 A1    Nov. 9, 2023

Related U.S. Application Data

(63) Continuation of application No. 17/662,502, filed on May 9, 2022.

(51) Int. Cl.
  *G06Q 40/00*    (2023.01)
  *G06F 16/23*    (2019.01)
  *G06Q 40/04*    (2012.01)

(52) U.S. Cl.
  CPC ......... *G06Q 40/04* (2013.01); *G06F 16/2365* (2019.01); *G06F 16/2379* (2019.01)

(58) Field of Classification Search
  CPC ..... G06Q 40/00; G06Q 40/04; G06F 16/2379
  See application file for complete search history.

(56) References Cited

U.S. PATENT DOCUMENTS

| 7,269,575 B1 | 9/2007 | Concannon et al. |
| 2003/0125969 A1 | 7/2003 | Kizer et al. |
| 2015/0081537 A1* | 3/2015 | Milam ............... G06F 16/148 |
| | | 705/40 |

FOREIGN PATENT DOCUMENTS

| CN | 104182879 A | * 12/2014 |
| EP | 1811440 A1 | 7/2007 |
| WO | 2008033960 A2 | 3/2008 |
| WO | 2015042605 A1 | 3/2015 |

OTHER PUBLICATIONS

Risk-based payment fraud detection K Julisch—IBM Research, Switzerland, 2010—dominoweb.draco.res.ibm.com (Year: 2010).*
International Search Report issued in International Application No. PCT/US2023/021327 dated Jul. 3, 2023 (13 pages).
Risk-based payment fraud detection K Julisch—IBM Research, Switzerland, 2010—dominoweb.draco.res.ibm.com (Year: 2010).

* cited by examiner

*Primary Examiner* — Lalita M Hamilton
(74) *Attorney, Agent, or Firm* — Bookoff McAndrews, PLLC (57) ABSTRACT

Systems and methods for importing a batch of receiver accounts. One method may include: receiving, at a user interface of the application platform on an information handling device, a selection to import a receiver file, wherein the receiver file comprises a listing of a plurality of receiver accounts; identifying, via analysis of the receiver file, one or more data points associated with each of the plurality of receiver accounts in the listing; determining, based on the identified one or more data points, whether a subset of the plurality of receiver accounts contain a deficiency; and providing, on the user interface of the application platform, results associated with the determining.

15 Claims, 8 Drawing Sheets

| fis RealNet™ | DASHBOARD  APIs  SUPPORT | ADMIN USERNAME LAST LOGIN: 01/17/20 18:22:56 | LOG OUT |

- DARK MODE
- MY TASKS
- TRANSACTION ACTIVITY
- SENDER ACCOUNTS
- RECEIVER ACCOUNTS
- USER PERMISSIONS
- REPORTS
- PROFILE SETTINGS
- BATCH PROCESSING
  - BATCH UPLOAD INFORMATION

BATCH PROCESSING

PAYMENTS | RECEIVERS

UPLOAD LOG 3 BATCH FILES

| IMPORTED FILE | 2021_DECEMBER_02_RECEIVER_IMPORT.CSV ˅ | | | | |

| DATE | BY ~610b | ITEMS IN FILE | SUCCESSFUL | FAILED | DESCRIPTION |
|---|---|---|---|---|---|
| 12/11/21 12:34:56 | AUSTIN OSBOURNE | 428 | 422 | 4 | PARTIALLY SUCCESSFUL |

▾ FAILED UPLOADS 6 ACCOUNTS (DOWNLOAD FAILED BATCH IMPORTS FILE) ~640

| | ROW ~620a | RECEIVER NAME | ERROR CODE / DESCRIPTION ~620c |
|---|---|---|---|
| 1 | ROW 26 | KERRY CARRINGTON | INVALID BANK CODE (MISSING CONTENT) |
| 2 | ROW 112 | YVETTE EVERETT | INVALID IBAN (NOT ENOUGH CHARACTERS) |
| 3 | ROW 227 | GEOFF JEFFERIES | INVALID BANK CODE (MISSING CONTENT) |
| 5 | ROW 404 | WARREN JUAREZ | INVALID IBAN (NOT ENOUGH CHARACTERS) |

▾ DUPLICATE UPLOADS 2 ACCOUNTS

| | FILE NAME ~630a | RECEIVER NAME | ACCOUNT/IBAN | SWIFT CODE ~610d |
|---|---|---|---|---|
| 1 | ROW 360 | KERRY CARRINGTON | 0****5678 | 012345678910 |
| 2 | ROW 361 | WARREN JUAREZ | 0****8765 | 109876543210 |

SYSTEMS AND METHODS FOR IMPORTING A BATCH OF RECEIVER ACCOUNTS ONTO AN APPLICATION PLATFORM OF A REAL-TIME PAYMENT NETWORK

CROSS REFERENCE TO RELATED APPLICATION(S)

This application is a continuation of U.S. patent application Ser. No. 17/662,502, filed May 9, 2022, which is incorporated herein in its entirety by this reference.

TECHNICAL FIELD

The present disclosure relates generally to the field of electronic transactions and, more particularly, to systems and methods for importing a batch of receiver accounts onto an application platform associated with a real-time payment network.

BACKGROUND

Businesses, merchants, consumers, financial entities, and/or government entities may perform electronic fund transfers, payment processing (e.g., e-commerce payments), capital management, etc. domestically and internationally over various payment networks. To facilitate payments and/or funds transfer to one or more receivers, information associated with their respective receiver account(s) needs to be entered into a transaction processing system. Conventionally, receiver accounts are entered into the system iteratively (i.e., one by one). Such a process may be burdensome and time-consuming, especially in situations where a batch payment is required (e.g., when payments need to be facilitated to hundreds of receiver accounts). The present disclosure is directed to addressing these and other drawbacks to existing electronic transaction systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for quickly and easily importing a batch of receiver accounts onto an application platform, identifying the validity of each imported receiver account, and apprising a user of any issues associated with the import process.

An embodiment of the disclosure may be a method of importing a batch of receiver accounts onto an application platform associated with a real-time transaction system, the method including: receiving, at a user interface of the application platform on an information handling device, a selection to import a receiver file, wherein the receiver file comprises a listing of a plurality of receiver accounts; identifying, via analysis of the receiver file, one or more data points associated with each of the plurality of receiver accounts in the listing; determining, based on the identified one or more data points, whether a subset of the plurality of receiver accounts contain a deficiency; and providing, on the user interface of the application platform, results associated with the determining.

An embodiment of the disclosure may be a real-time transaction system, including: one or more computer readable media storing instructions for importing a batch of receiver accounts onto an application platform; and one or more processors configured to execute the instructions to perform operations comprising: receiving, at a user interface of the application platform on an information handling device, a selection to import a receiver file, wherein the receiver file comprises a listing of a plurality of receiver accounts; identifying, via analysis of the receiver file, one or more data points associated with each of the plurality of receiver accounts in the listing; determining, based on the identified one or more data points, whether a subset of the plurality of receiver accounts contain a deficiency; and providing, one the user interface of the application platform, results associated with the determining.

An embodiment of the disclosure may be a real-time transaction system, including: one or more computer readable media storing instructions for importing a batch of receivers accounts onto an application platform associated with a real-time electronic transaction; and one or more processors configured to execute the instructions to perform operations comprising: receiving, at a user interface of the application platform on an information handling device, a selection to import a receiver file, wherein the receiver file comprises a listing of a plurality of receiver accounts; identifying, via analysis of the receiver file, one or more data points associated with each of the plurality of receiver accounts in the listing; determining, based on the identified one or more data points, whether a subset of the plurality of receiver accounts contain a deficiency; and providing, on the user interface of the application platform, results associated with the determining.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION OF EMBODIMENTS

The following embodiments describe systems and methods for importing a batch of receiver accounts onto an application platform associated with a real-time transaction system. More particularly, the embodiments contemplated in the present disclosure may enable merchants, customers, businesses, institutions, etc. to quickly and easily import large volumes of receiver account information.

As discussed above, conventional transaction platforms may only enable users to enter receiver information for payment beneficiaries one at a time. Such a process may be very burdensome, especially for entities that need to facilitate payments to many beneficiaries often. For example, given an organization or entity that needs to facilitate payment to hundreds of different vendors on a regular basis, the current requirement to import receiver account information for each vendor individually may be very time-consuming and could even potentially result in payment delays.

To address the above-noted problems, the present disclosure describes systems and methods that provide options to a user to upload receiver account information for a batch of receiver accounts substantially all at once. Additionally, during the importing process, embodiments of the disclosure may identify issues associated with one or more of the receiver accounts and may provide the user with quick and straight forward methods of remedying the identified issues.

In one embodiment, a selection to import a receiver file containing information associated with a batch of receiver accounts may be received at an application platform associated with a real-time transaction system. An embodiment may then identify, using one or more data analysis techniques, one or more data points associated with each receiver account. Thereafter, an embodiment may determine whether any of the receiver accounts in the receiver file contain a deficiency that may make the receiver account unrecognizable or unverifiable to the real-time transaction system. Responsive to determining that at least one of the receiver accounts is deficient, an embodiment may inform a platform user of the deficient account(s) and may provide the user with options to remedy the deficiency. For all successfully imported receiver accounts, an embodiment may update, on the application platform, a receiver accounts data store.

It should be appreciated that particular consideration is made herein to payment transactions relating to businesses, merchants, and/or consumers. Despite this reference to payment transactions relating to businesses, merchants, and or consumers, certain disclosed systems and methods may apply equally well to various other e-commerce and electronic transactions. Effectively, any circumstance where credit, currency, crypto currency, collateralized funds, smart contracts, and/or tokenized funds thereto, is being transmitted over a network, systems and methods disclosed herein may be employed. Further, while the party seeking to initiate an electronic transaction and/or provide a third-party service may be referred to herein as a business, a merchant, or a consumer, a party seeking to initiate an electronic transaction need not be a business, a merchant, or a consumer, but may be a financial institution, a government institution, a service provider, a user, or any party seeking to execute an electronic transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
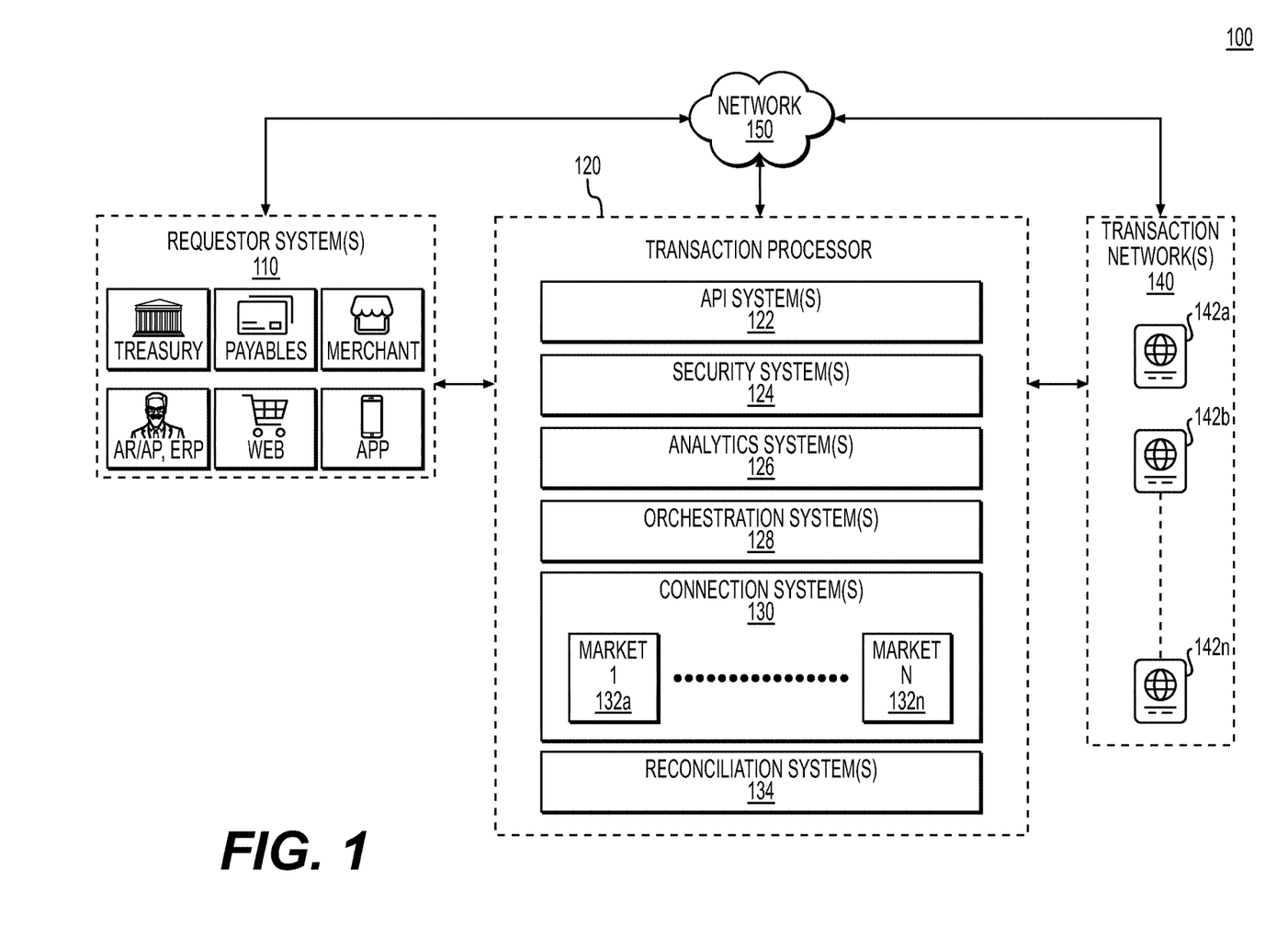
FIG. 1 depicts a block diagram of an exemplary electronic transaction system, according to one aspect of the present disclosure.

Referring now to the appended drawings, FIG. 1 depicts an exemplary real-time transaction system 100 including a requestor system(s) 110, a transaction processor 120, and a transaction network(s) 140. The requestor system(s) 110, the transaction processor 120, and the transaction network(s) 140 may be in communication with each other directly, indirectly, and/or via a network 150 (e.g., the Internet and/or one or more cloud networks). The requestor system(s) 110, the transaction processor 120, and the transaction network(s) 140 may also be in communication with each other directly via direct lines of communication, via combinations of physical, technological, and/or business relationships. The requestor system(s) 110 may include one more entities, for example, but not limited to, treasury, merchants, consumers, businesses, financial institutions, government institutions, etc. The requestor system(s) 110 may transmit, for example, a request to transmit electronic funds to one or more receivers.

In one embodiment, the requestor system(s) 110 may be configured to facilitate a business requesting to transmit electronic funds to a consumer. In this embodiment, the electronic funds may include, for example, legal settlements, insurance claims, shareholder dividends, loyalty payments, loans, investment disbursements, customer refund pay-outs, etc. In another embodiment, the requestor system(s) 110 may be configured to facilitate a business requesting to transmit electronic funds to another business. In this embodiment, the electronic funds may include, for example, accounts receivables/payables (AR/AP), rent payments, business loan payments, payroll, bank-to-bank cross border payments, supplier payments, freelancer disbursements, supply chain finance disbursements, business medical benefits disbursements, affiliate marketing programs disbursements, etc. In another embodiment, the requestor system(s) 110 may be configured to facilitate a consumer requesting to transmit electronic payments to a business (or a merchant). In this embodiment, the electronic payments may include, for example, payments at point of sale terminals, payments at eCommerce checkouts, online marketplace payments, online digital content payments, sports wagering payments, telecommunication bill payments, utilities payments, rent payments, investment payments, etc. In another embodiment, the requestor system(s) 110 may be configured to facilitate a user (e.g., any individual or consumer) requesting to transmit electronic funds to another user. In this embodiment, the electronic funds may include, for example, crowdfunding payments, mobile wallet payments, gift payments, person-to-person payments, account-to-account transfers, etc. In another embodiment, the requestors system(s) 110 may be configured to facilitate a government entity requesting to transmit electronic funds to a consumer. In this embodiment, the electronic funds may include, for example, government benefits payments, student aid payments, tuition payments, tuition reimbursement payments, etc. In another, the requestors system(s) 110 may be configured to facilitate a user or consumer requesting to transmit electronic payments to a government entity. In this embodiment, the electronic funds may include, for example, transit payments, parking payments, tax payments, permit payments, payroll payments, etc.

In one embodiment, the requestor system(s) 110 may utilize an integration portal (or platform) and/or integration services provided by the transaction processor 120 for integrating user experience and/or user interfaces (e.g., AR/AP, Enterprise Resource Planning (ERP) system, a website, an app, etc.) for interacting with the transaction processor 120. In some embodiments, the requestor system(s) 110 may be integrated with the transaction processor 120 by using integration tool kits/services and/or a do-it-yourself (DIY) model utilizing the API system(s) 122 of the transaction processor 120.

Still referring to FIG. 1, the transaction processor 120 may include an application programming interface (API) system(s) 122 (e.g., an API gateway), a security system(s) 124, an analytics system(s) 126, an orchestration system(s) 128, a connection system(s) 130, and a reconciliation system(s) 134. The connection system(s) 130 may be configured to communicate with various markets domestically and/or internationally (e.g., Markets 1-N 132a-132n). The transaction processor 120 may be configured to facilitate electronic transactions and communications between the requestor system(s) 110 and the transaction network(s) 140. For example, the API system(s) 122 may receive one or more requests to transfer funds (or payments) electronically from the requestor system(s) 110 via an API (e.g., a representational state transfer (RESTful), real-time API, or file-based batch API of the transaction processor 120. The RESTful API (or API) may be accessed over one or more public Hypertext Transfer Protocol Secure (HTTPS) endpoints. The batch API (or API) may be accessed over one or more public Secure File Transfer Protocol (SFTP) endpoints. The API may include capabilities to create customer identities in the transaction processor 120, associate bank accounts to the customer identities, and make payments between multiple accounts. The API system(s) 122 may communicate with the security system(s) 124, analytics system(s) 126, and the orchestration system(s) 128 to execute the electronic transactions of the present disclosure. For example, the API system(s) 122 may transmit the electronic fund transfer (or payment) requests to the orchestration system(s) 128. The orchestration system(s) 128 may then transmit the electronic payment requests to appropriate networks or schemes in the transaction network(s) 140 via the connection system(s) 130. (Further described later in detail below.) Additionally, the reconciliation system(s) 134 may receive notifications, messages, and/or acknowledgements from the transaction network(s) 140, and may transmit appropriate messages, alerts, and/or signals associated with the electronic fund transfer request to the requestor system(s) 110 in real-time.

The transaction processor 120 may be a single processor utilizing a single API domestically and/or internationally across the globe. That is, the transaction processor 120 may facilitate account-to-account real-time electronic transactions (e.g., electronic payments, funds transfer, currency exchange, reimbursement, asset managements, etc.) by establishing a client centric platform that unifies, orchestrates, and executes electronic transactions domestically and/or internationally. Moreover, the transaction processor 120 may be configured to execute electronic fund transfers, currency exchange transactions, tokenization, and/or electronic transaction authorizations within the single platform. Further, the transaction processor 120 may be configured to operate consistently, in accordance with globally accepted security and privacy practices. Furthermore, the transaction processor 120 may be configured to perform intelligent payment routing via the orchestration system(s) 128 in real-time based on user (e.g., the requestor system(s) 110) preferences. In some embodiments, the user may make changes to transaction routing preferences (e.g., time and costs of completing payment transactions) in real-time. The transaction processor 120 of the present disclosure may provide, among other things, a single partner accountability, cost reduction, improved cash flow, increased payment security, improved access to payments, and better insight and accountability of payments/funds. Thus, the transaction processor 120 may be a one-stop shop for executing payments transactions.

Still referring to FIG. 1, the transaction network(s) 140 may include one or more networks or schemes 142a, 142b-142n. The one or more schemes (or networks) 142a-142n may include, for example, an Automated Clearing House (ACH) networks (e.g., ACH, Same Day ACH, etc.), Card networks (e.g., American Express, Discover, MasterCard, Visa, etc.), Real Time Payment (RTP) networks (e.g., the Clearing House, etc.), blockchain networks, wire transfer networks, Faster Payments network, Bankers' Automated Clearing System (Bacs) Payment Schemes, the Clearing House Automated Payment System (CHAPS) network, Single Euro Payments Area (SEPA) network, SEPA Instant Credit Transfer (SCT Inst) network, and/or other financial platform networks (e.g., Dwolla, PayPal, Western Union, Currencycloud, TransferMate, etc.). The transaction network(s) 140 may complete or reject the electronic fund transfer request upon authenticating and/or authorizing the electronic fund transfer request in accordance with the established policies and/or rules of one or more of the schemes 142a, 142b-142n.

Figure 2:
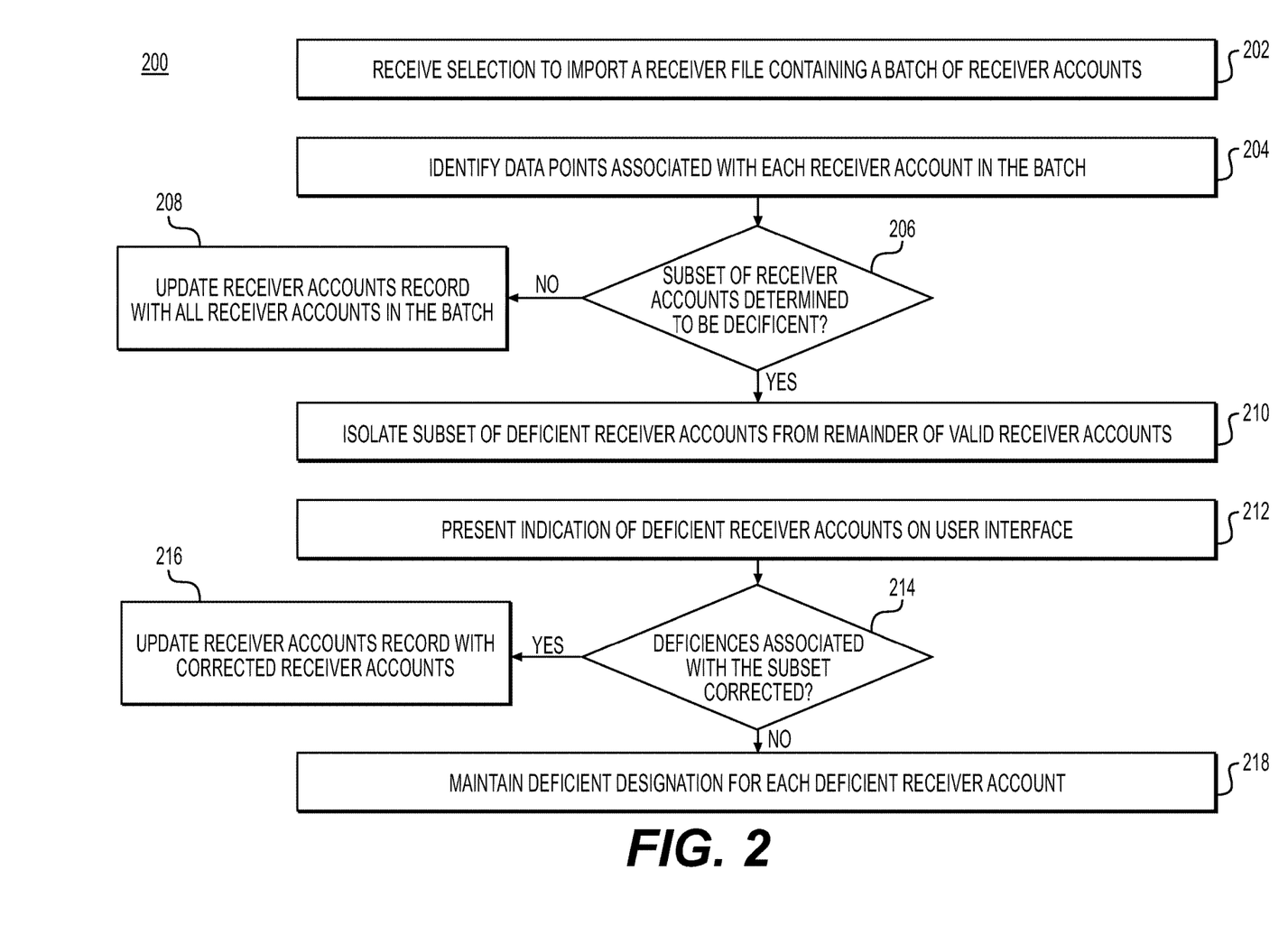
FIG. 2 illustrates a flowchart of an exemplary method of importing a batch of receiver accounts onto an application platform, according to one aspect of the present disclosure.

FIG. 2 illustrates a flowchart of an exemplary method 200 of importing a batch of receiver accounts onto an application platform associated with the real-time transaction system 100. Exemplary process flows of the method 200, performed in accordance with the system 100 and with further reference to FIGS. 3-6, are described hereinafter.

At step 202, an embodiment may receive a user selection to import a receiver file containing a batch of receiver accounts onto the application platform. In an embodiment the import selection may be facilitated via interaction with a user interface of the application platform. More particularly, a user may provide selection input to the user interface using one or more different means, such as touch input, stylus input, mouse and/or keyboard input, voice input, and the like. In an embodiment, the receiver file may be imported onto the application platform in one or more different ways. For instance, a user may import the receiver file by selecting the relevant file from a drop-down list, selecting the file from a storage location (e.g., resident on the user's device, etc.), dragging and dropping the relevant file into a designated area of the user interface, and other techniques not explicitly disclosed here.

Figure 3:
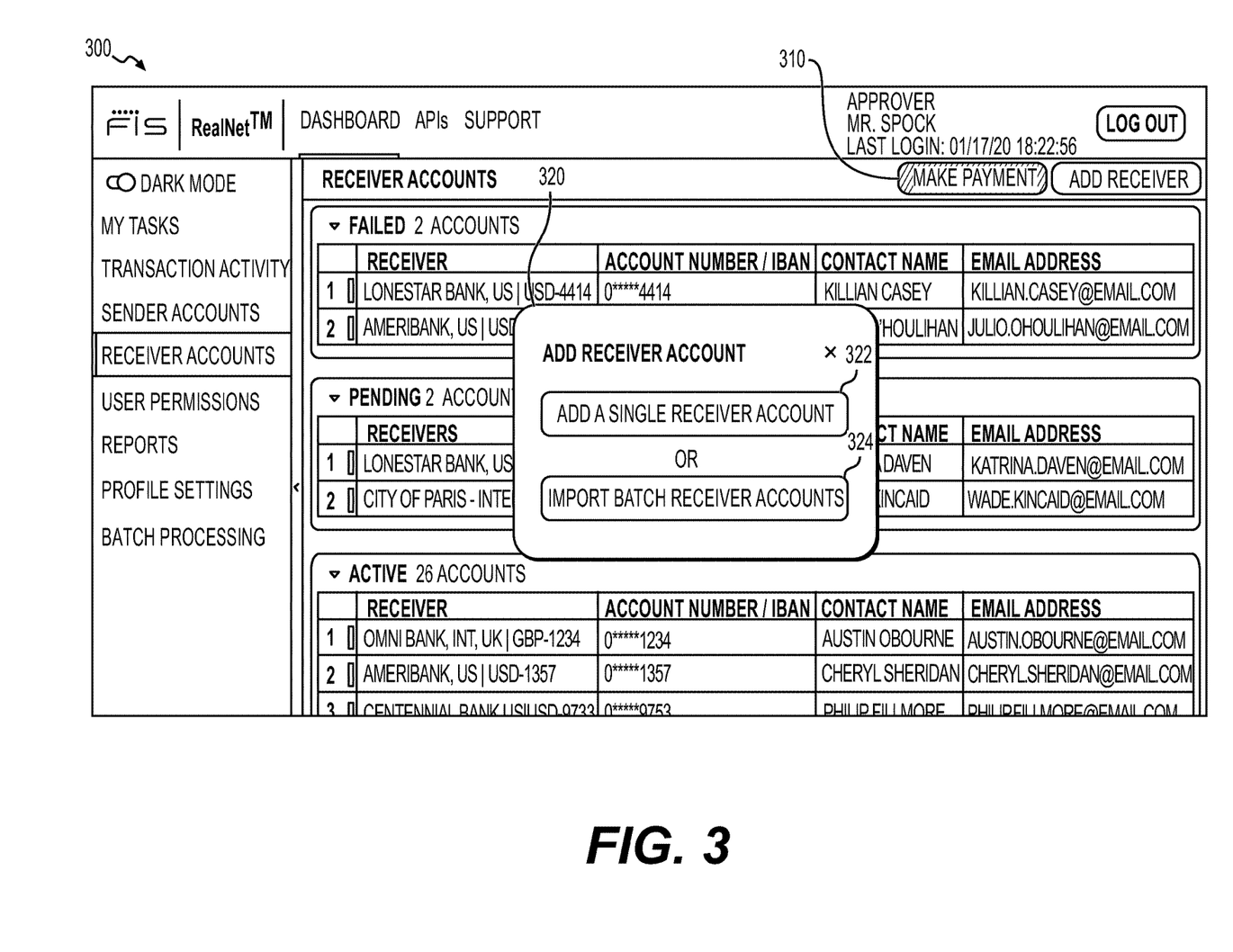
FIG. 3 illustrates an exemplary application platform user interface, according to one aspect of the present disclosure.
Figure 4:
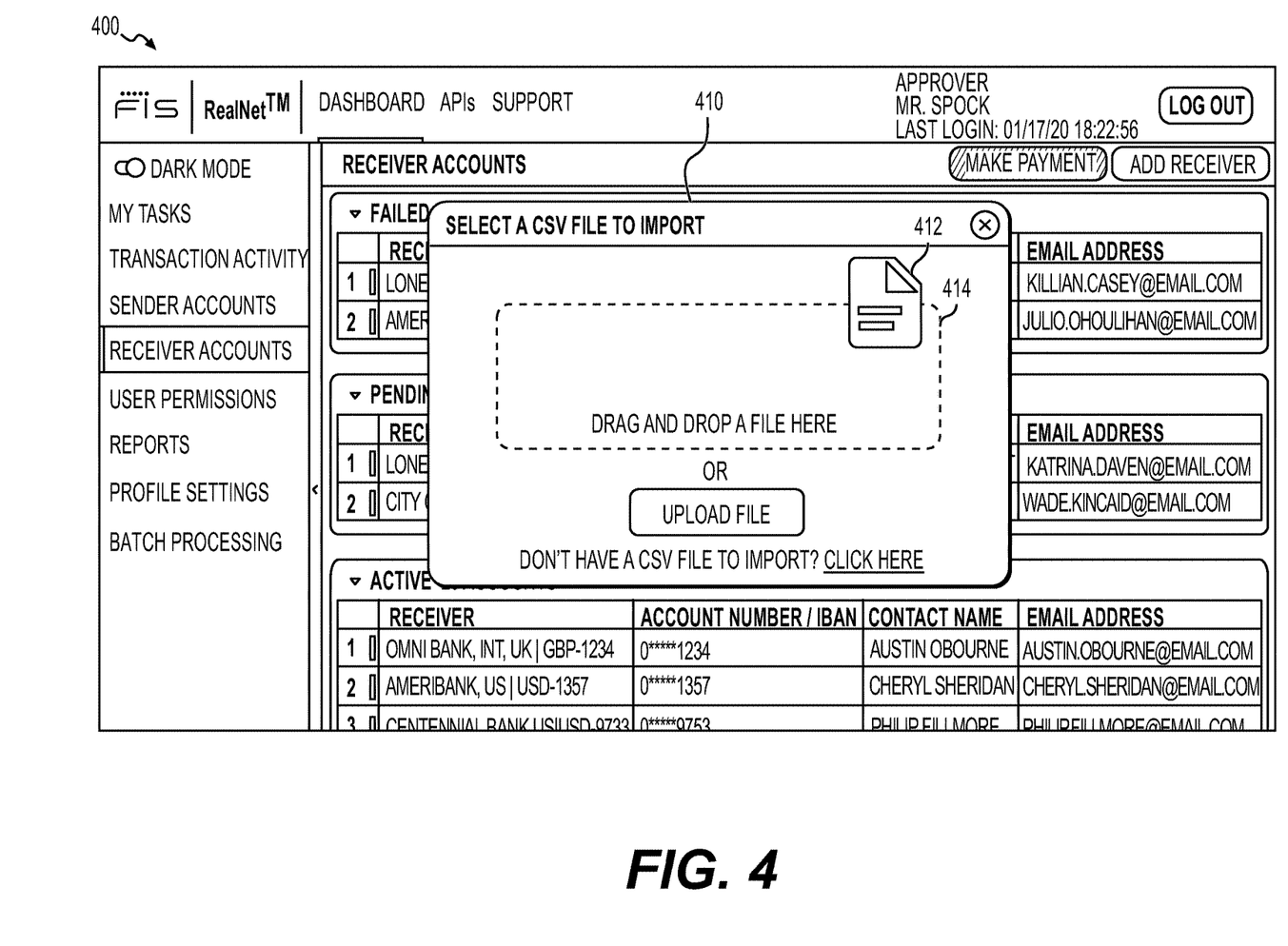
FIG. 4 illustrates an exemplary application platform user interface, according to one aspect of the present disclosure.
Figure 5:
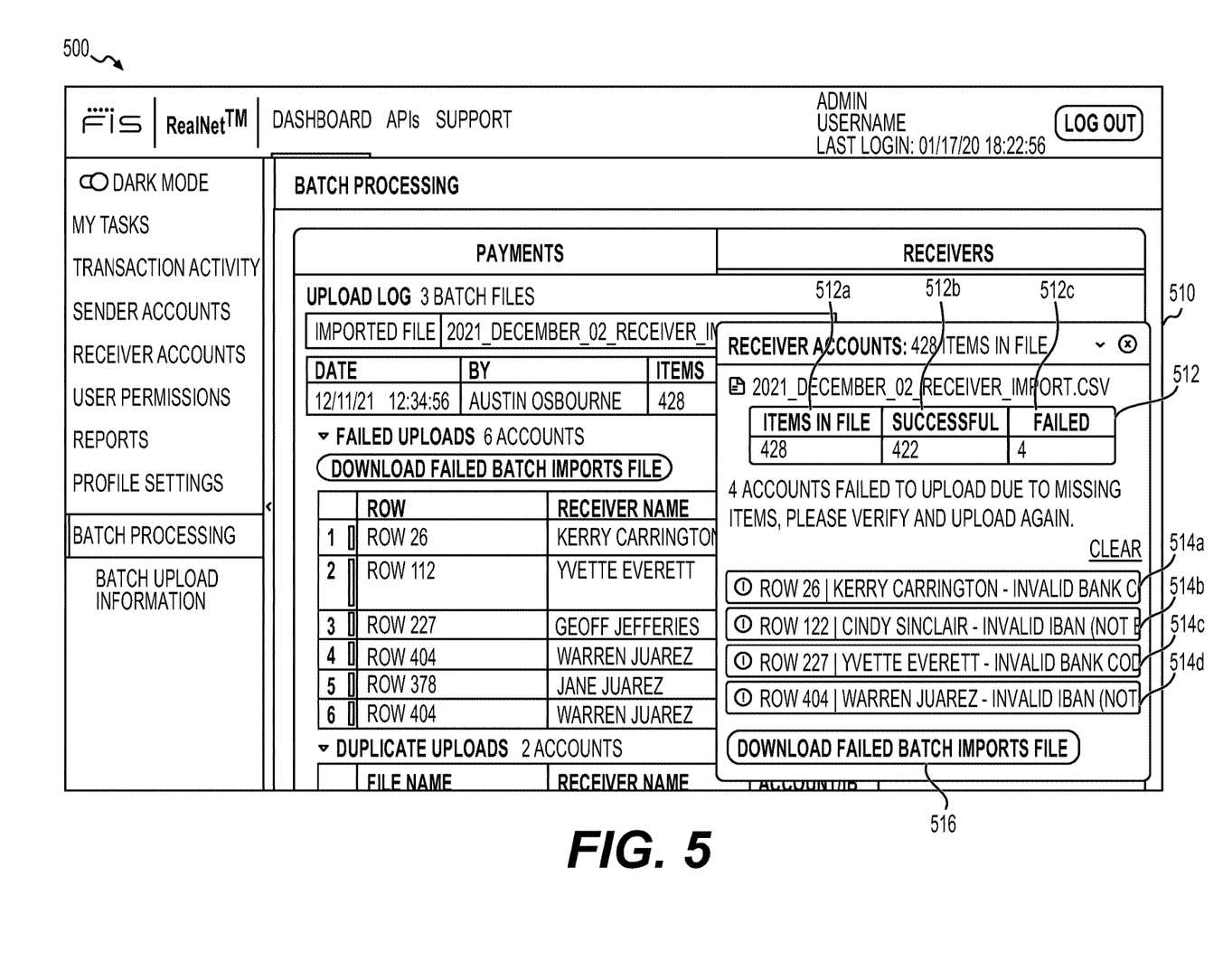
FIG. 5 illustrates an exemplary application platform user interface, according to one aspect of the present disclosure.

As a non-limiting example of the foregoing, and with respect to the user interface 300 depicted in FIG. 3, upon selection of a button 310 to add a receiver account, an option screen 320 may appear. This option screen 320 may contain a choice to add a single receiver account 322 or, alternatively, to import a batch of receiver accounts 324. Upon selection of the latter, a receiver account import screen 410 may appear overtop the user interface 400, as depicted in FIG. 4. In the embodiment depicted illustrated here, the user may drag and drop a selected receiver file 412 into a designated drop area 414. Once the receiver file is detected, the application platform pay proceed with the upload process.

In an embodiment, the receiver file may need to be of a predetermined file format (e.g., a comma-separated values (CSV) file, etc.). More particularly, one or more protocols associated with the application platform may require that all imported files to the application platform be of a specific file format and may correspondingly reject all files not having the appropriate formatting. Additionally or alternatively, the application platform may contain functionality to convert improperly formatted files into an acceptable format. For example, responsive to detecting that a receiver file has an inconsistent file format (i.e., a file format not supported by the application platform), an embodiment may provide a notification to the user that queries them whether they want to adjust the file formatting. Responsive to detecting confirmation input from the user, an embodiment may proceed with the file format conversion. Alternatively to the foregoing, an embodiment may facilitate the file format conversion automatically (i.e., upon detecting an improperly formatted file and without receipt of any additional user input).

At step 204, an embodiment may identify data points associated with each receiver account in the receiver file. More particularly, each receiver account in the receiver file may contain one or more articles of identifying information, such as: information associated with the receiver account owner (e.g., name, address, communication information, etc.), business information associated with the receiver account (e.g., business name, address, status of incorporation, etc.), bank information associated with the receiver account (e.g., bank name, address, receiver account number, bank identifier code (BIC), international bank account number (IBAN), etc.), and the like. An embodiment may utilize one or more data analysis techniques known in the art to parse each receiver account in the receiver file and retrieve some or all of the foregoing types of information.

At step 206, an embodiment may determine whether at least a subset of the receiver accounts are deficient. In this regard, an embodiment may determine whether one or more of the identified data points associated with each receiver account is incorrect, unverifiable, a duplicate of another listed receiver account, and/or otherwise deficient to prevent the real-time transaction system from properly facilitating payments to the receiver account. In an embodiment, the determination may be facilitated by comparing some or all of the identified data points in each receiver account to one or more databases containing stored and/or verifiable information associated with those accounts. For example, for a particular receiver account, the real-time transaction system may identify that the listed BIC for the receiver account is invalid because it does not have the correct amount and/or ordering of alphanumeric digits. As another example, an embodiment may communicate with the designated bank or financial institution to determine whether the listed information in the receiver account is valid (e.g., an embodiment may determine whether the listed financial institution has a record of the account number provided in the receiver account).

Responsive to determining, at step 206, that no deficiencies exist with any of the receiver accounts, an embodiment may, at step 208, update a receiver accounts record with all of the receiver accounts in the receiver file. Additionally, an embodiment may provide an indication to the user of a completely successful import on the user interface. Conversely, responsive to determining, at step 206, that a deficiency exists with a subset of the receiver accounts (i.e., a deficiency exists with at least one of the receiver accounts), an embodiment may, at step 210, isolate the subset of deficient accounts from the remainder of valid receiver accounts and present, at step 212, an indication of the deficient receiver accounts to the user.

In an embodiment, the notification of deficient receiver accounts may manifest on the application platform in one or more different ways. For example, with reference to the user interface 500 depicted in FIG. 5, an import status window 510 may appear overtop of a portion of the user interface 500. The import status window 510 may contain an import status table 512 that may provide an indication of: the total number of receiver accounts identified in the receiver file 512a, the total number of successfully imported receiver accounts 512b, and the total number of receiver accounts that failed to import 512c (i.e., due to detected deficiencies). Additionally, the import status window 510 may contain indications of each deficient receiver account 514(a-d). Additionally still, the import status window 510 may contain an option 516 to download the portions of the receiver file associated with the deficient receiver accounts 514(a-d) (a process that is further described herein).

Additionally or alternatively to the foregoing, an embodiment may provide more comprehensive information of the import process to the user. More particularly, with reference to the user interface 600 depicted in FIG. 6, an import status table 610 may be presented that identifies one or more of: the date that the receiver file was imported onto the application platform 610a, the individual that imported the receiver file 610b, the total number of receiver accounts identified in the receiver file 610c, the total number of successfully imported receiver accounts 610d, the total number of receiver accounts that failed to import 610e, and a status description identifying how successful import of the receiver accounts was 610f. Additionally or alternatively, the user interface 600 may present a deficient accounts table 620 that may identify: the location in the receiver file the deficient receiver account is located 620a, the beneficiary associated with the deficient receiver account 620b, and a description of the deficiency 620c. Additionally or alternatively, the user interface 600 may present a duplicate accounts table 630 that may identify: the location in the receiver file of the duplicate account 630a, the beneficiary associated with duplicate receiver account 630b, the account number/IBAN 630c, and the BIC/Swift Code 630d.

Figure 6:
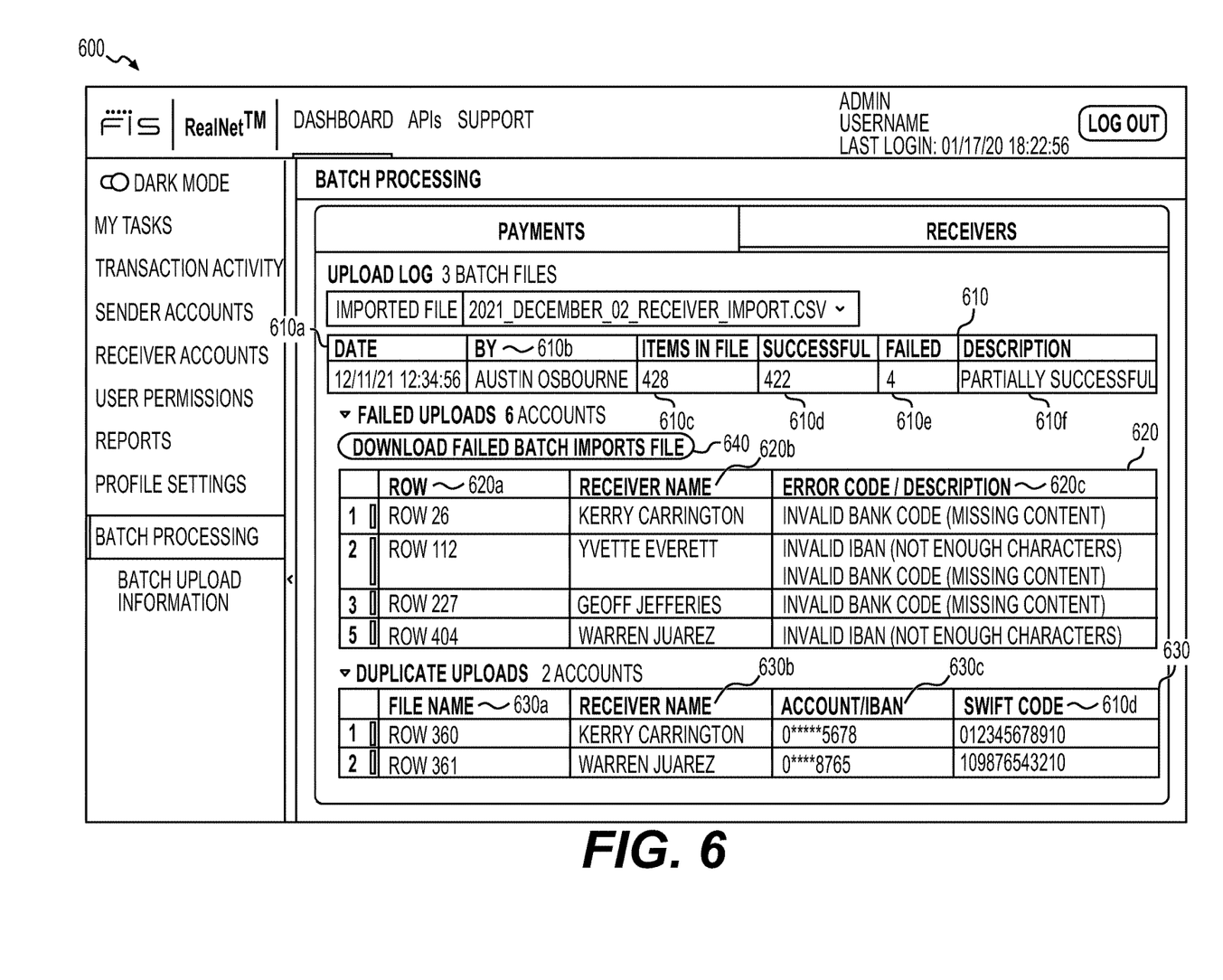
FIG. 6 illustrates an exemplary application platform user interface, according to one aspect of the present disclosure.

Additionally to the foregoing, the user interface 600 may contain an option 640 to download the portions of the receiver file associated with the deficient receiver accounts. More particularly, upon selection of this option 640, the application platform may identify which receiver accounts in the receiver file are deficient, download the data associated with each deficient account, and present that information to the user in an editable document. The user may then refer to the reference information presented in the error description tab 620c of the import status table 610 to locate the issues present within each deficient receiver account. The user may then correct the deficiencies, save changes to the edited file, and then attempt to import the corrected file onto the application platform, as previously described above in step 202.

Responsive to determining, at 214, that the deficiencies associated with one or more of the originally deficient accounts have been corrected, an embodiment may, at 216, update the receiver accounts record to include the corrected accounts. In this regard, the corrected receiver accounts may now be eligible to be selected in one or more transaction processes (e.g., in a batch payment transaction, etc.). Conversely, responsive to determining, at 214, that no attempts at correction have been made to any of the originally deficient receiver accounts or that at least one originally deficient receiver account remains deficient, an embodiment may, at 218, maintain a deficient designation for the relevant receiver account. More particularly, any deficient receiver account may be visually distinguished to the user and/or may not be eligible to be selected in any future transaction process until the issues are remedied.

Figure 7:
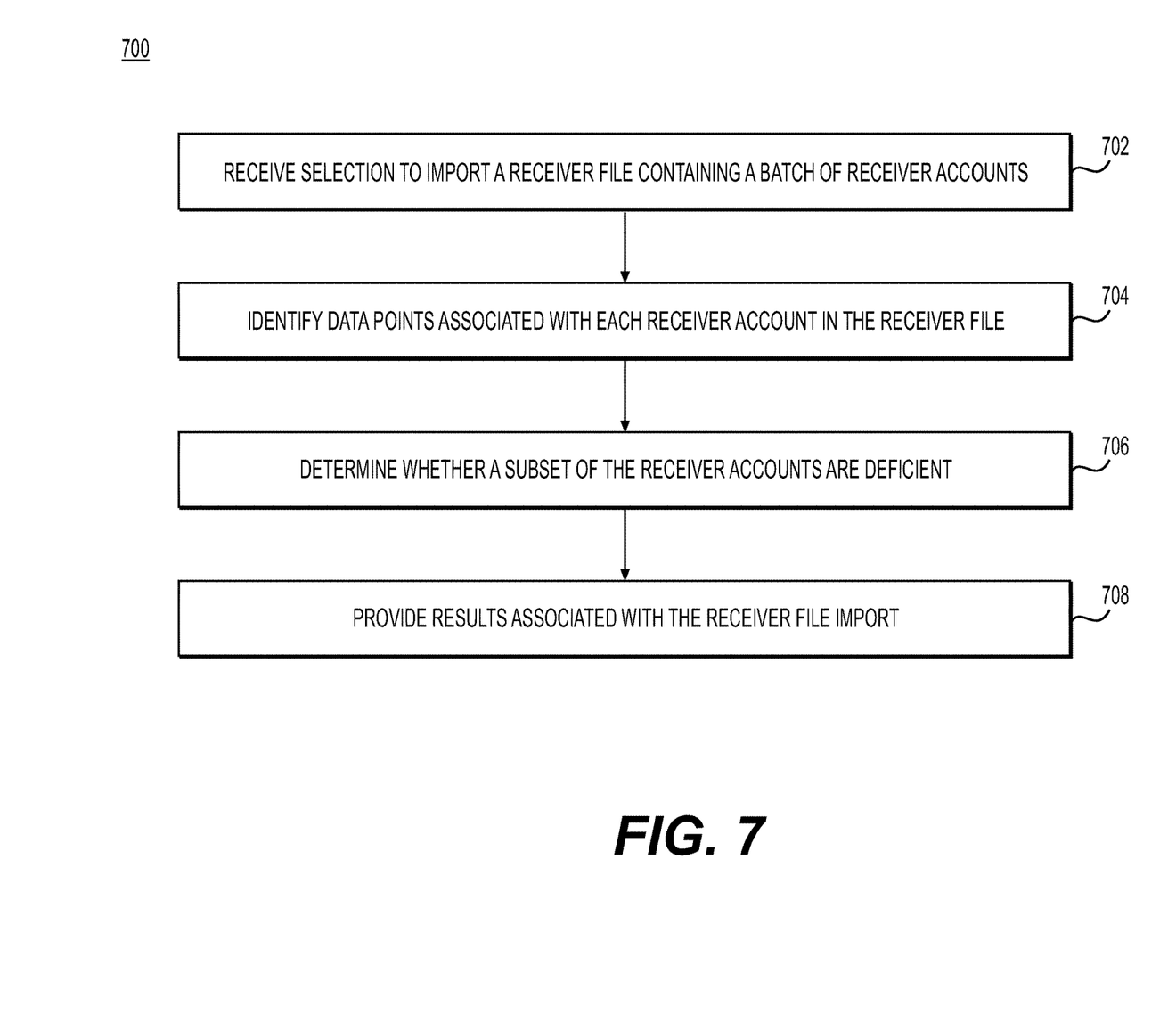
FIG. 7 illustrates a flowchart of an exemplary method of importing a batch of receiver accounts onto an application platform, according to one aspect of the present disclosure.

FIG. 7 illustrates a flowchart of an exemplary method 700 of importing a batch of receiver accounts onto an application platform associated with the real-time transaction system 100. Exemplary process flows of the method 700, performed in accordance with the real-time transaction system 100, are described hereinafter.

At step 702, an embodiment may receive a selection to import a receiver file onto an application platform. The receiver file may contain a plurality of receiver accounts (e.g., dozens of receiver accounts, hundreds of receiver accounts, etc.) and relevant information associated therewith. In an embodiment, the receiver file may be of a specific file format, as dictated by the protocols of the application platform. At step 704, an embodiment may identify one or more data points associated with each receiver account in the receiver file. More particularly, an embodiment may parse each receiver account to identify one or more of: information associated with the receiver account owner, business information associated with the receiver account, bank information associated with the receiver account, and the like. At step 706, an embodiment may determine whether one or more of the receiver accounts (i.e., a subset of the receiver accounts) are deficient. In this regard, an embodiment may determine whether one or more of the identified data points associated with each receiver account is incorrect, unverifiable, a duplicate of another listed receiver account, and/or otherwise deficient to prevent the real-time transaction system from properly facilitating payments to the receiver account. At step 708, an embodiment may provide an indication of the determination to a user of the application platform. In a situation where deficient receiver accounts are detected, an embodiment may identify these deficient accounts to the user (e.g., on the user interface of the application platform) and may provide an indication of the deficiency associated with therewith.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 8:
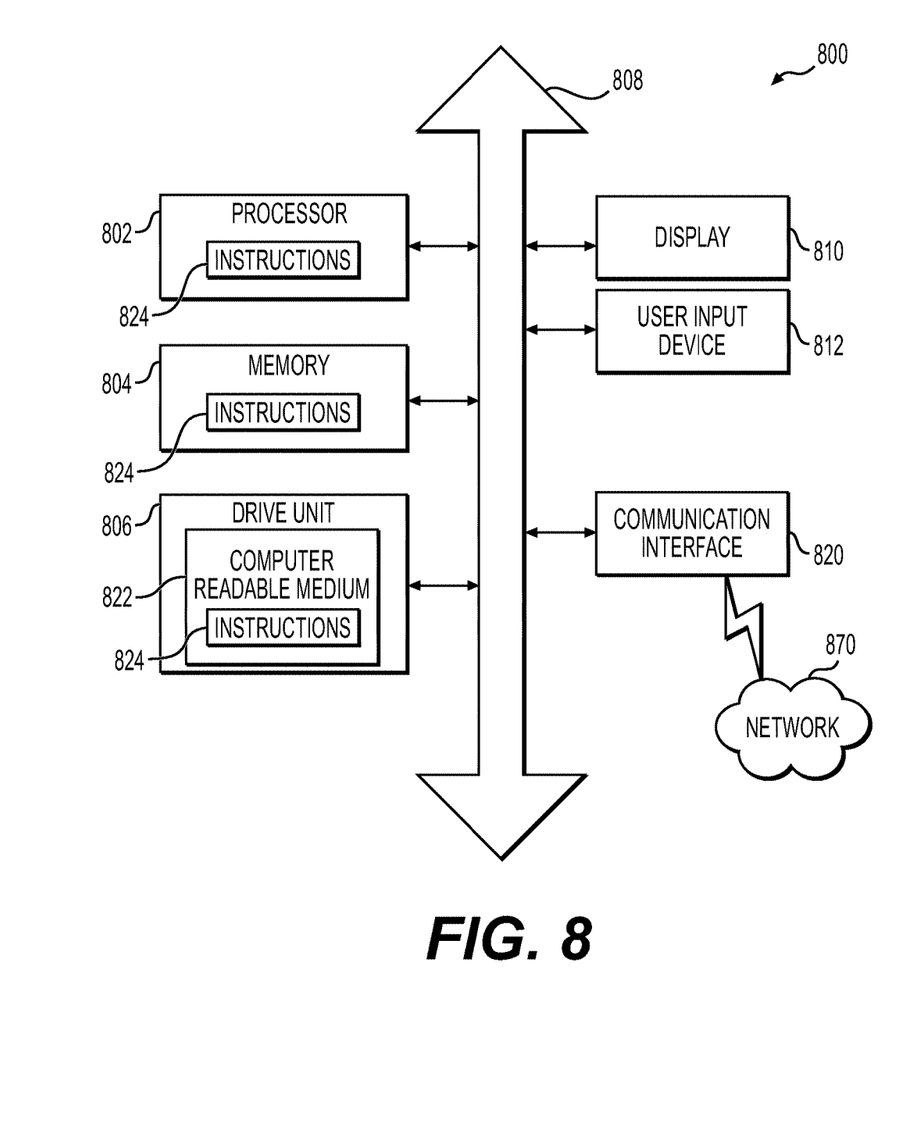
FIG. 8 illustrates a computer system for executing the techniques described herein.

FIG. 8 illustrates a computer system designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random-access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel payment and the like.

As shown, the computer system 800 may further include a display unit 810, such as a liquid crystal display (LCD), an organic light emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input device 812 configured to allow a user to interact with any of the components of system 800. The input device 812 may be a number pad, a keyboard, or a cursor control device, such as a mouse, or a joystick, touch screen display, remote control, or any other device operative to interact with the computer system 800.

The computer system 800 may also or alternatively include a disk or optical drive unit 806. The disk drive unit 806 may include a computer-readable medium 822 in which one or more sets of instructions 824, e.g., software, can be embedded. Further, the instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 870 can communicate voice, video, audio, images, or any other data over the network 870. Further, the instructions 824 may be transmitted or received over the network 870 via a communication port or interface 820, and/or using a bus 808. The communication port or interface 820 may be a part of the processor 802 or may be a separate component. The communication port 820 may be created in software or may be a physical connection in hardware. The communication port 820 may be configured to connect with a network 870, external media, the display 810, or any other components in system 800, or combinations thereof. The connection with the network 870 may be a physical connection, such as a wired Ethernet connection or may be established wirelessly as discussed below. Likewise, the additional connections with other components of the system 800 may be physical connections or may be established wirelessly. The network 870 may alternatively be directly connected to the bus 808.

While the computer-readable medium 822 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 822 may be non-transitory, and may be tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to one or more networks 870. The network 870 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 870 may include wide area networks (WAN), such as the Internet, local area networks (LAN), campus area networks, metropolitan area networks, a direct connection such as through a Universal Serial Bus (USB) port, or any other networks that may allow for data communication. The network 870 may be configured to couple one computing device to another computing device to enable communication of data between the devices. The network 870 may generally be enabled to employ any form of machine-readable media for communicating information from one device to another. The network 870 may include communication methods by which information may travel between computing devices. The network 870 may be divided into sub-networks. The sub-networks may allow access to all of the other components connected thereto or the sub-networks may restrict access between the components. The network 870 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method of importing a batch of receiver accounts onto an application platform associated with a real-time transaction system, the method comprising:
   receiving, at an import receiver account options screen on a graphical user interface of the application platform, a selection to import a receiver file, wherein the receiver file comprises a listing of a plurality of receiver accounts;
   determining, subsequent to the receiving, that at least a subset of the plurality of receiver accounts are invalid;
   isolating, based on the determining, the subset of the plurality of receiver accounts that are invalid from a remainder of the plurality of receiver accounts that are valid;
   presenting, on an imported receiver account results page of the application platform, an indication of the subset of the plurality of receiver accounts that are invalid;
   displaying, on the imported receiver account results page, a deficient receiver account download icon;
   downloading, upon detecting selection input provided to the deficient receiver account download icon, data associated with each of the subset of the plurality of receiver accounts;
   providing the downloaded data in an editable document;
   receiving, at the import receiver account options screen on the graphical user interface, another selection to import the editable document containing user edits to portions of the downloaded data for each of the subset of the plurality of receiver accounts;
   determining that the subset of the plurality of receiver accounts containing the user edits in the imported editable document are valid; and
   updating, responsive to the determining, a receiver accounts record with the subset of the plurality of receiver accounts containing the user edits.

2. The method of claim 1, further comprising:
   determining, subsequent to the receiving and using a processor associated with the real-time transaction system, whether the receiver file is in a predetermined file format; and
   automatically converting the receiver file to the predetermined file format responsive to determining that the receiver file is not in the predetermined file format.

3. The method of claim 1, wherein the determining comprises:
   identifying, via analysis of the receiver file, one or more data points associated with each of the plurality of receiver accounts in the listing;
   accessing, via communication with another financial entity associated with at least one of the one or more data points, a storage database;
   comparing the identified one or more data points against one or more other data points in the storage database; and
   ascertaining, based on determining that a discrepancy exists between the identified one or more data points and the one or more other data points, that an error exists in the one or more data points.

4. The method of claim 1, wherein the presenting the indication comprises displaying, within an import status table on the imported receiver account results page, a deficient accounts table comprising information that identifies: a row location in the receiver file where an error in each of the subset of the plurality of receiver accounts is located, a beneficiary associated with each of the subset of the plurality of receiver accounts, and an error description explaining the error.

5. The method of claim 1, wherein the presenting the indication comprises displaying, on the imported receiver account results page, a duplicate accounts table that identifies a row location in the receiver file where of one or more duplicate accounts are located.

6. A real-time transaction system, comprising:
   one or more computer readable media storing instructions for importing a batch of receiver accounts onto an application platform; and
   one or more processors configured to execute the instructions to perform operations comprising:
     receiving, at an import receiver account options screen on a graphical user interface of the application platform, a selection to import a receiver file, wherein the receiver file comprises a listing of a plurality of receiver accounts;
     determining, subsequent to the receiving, that at least a subset of the plurality of receiver accounts are invalid;
     isolating, based on the determining, the subset of the plurality of receiver accounts that are invalid from a remainder of the plurality of receiver accounts that are valid;
     presenting, on an imported receiver account results page of the application platform, an indication of the subset of the plurality of receiver accounts that are invalid;
     displaying, on the imported receiver account results page, a deficient receiver account download icon;
     downloading, upon detecting selection input provided to the deficient receiver account download icon, data associated with each of the subset of the plurality of receiver accounts;
     providing the downloaded data in an editable document;
     receiving, at the import receiver account options screen on the graphical user interface, another selection to import the editable document containing user edits to portions of the downloaded data for each of the subset of the plurality of receiver accounts;
     determining that the subset of the plurality of receiver accounts containing the user edits in the imported editable document are valid; and
     updating, responsive to the determining, a receiver accounts record with the subset of the plurality of receiver accounts containing the user edits.

7. The real-time transaction system of claim 6, further comprising:
   determining, subsequent to the receiving and using a processor associated with the real-time transaction system, whether the receiver file is in a predetermined file format; and
   automatically converting the receiver file to the predetermined file format responsive to determining that the receiver file is not in the predetermined file format.

8. The real-time transaction system of claim 6, wherein the determining comprises:
   identifying, via analysis of the receiver file, one or more data points associated with each of the plurality of receiver accounts in the listing;

accessing, via communication with another financial entity associated with at least one of the one or more data points, a storage database;

comparing the identified one or more data points against one or more other data points in the storage database; and ascertaining, based on determining that a discrepancy exists between the identified one or more data points and the one or more other data points, that an error exists in the one or more data points.

9. The real-time transaction system of claim 6, wherein the presenting the indication comprises displaying, within an import status table on the imported receiver account results page, a deficient accounts table comprising information that identifies: a row location in the receiver file where each of the subset of the plurality of receiver accounts are located, a beneficiary associated with each of the subset of the plurality of receiver accounts, and an error description associated with each of the subset of the plurality of receiver accounts.

10. The real-time transaction system of claim 6, wherein the presenting the indication comprises displaying, on the imported receiver account results page, a duplicate accounts table that identifies a row location in the receiver file where of one or more duplicate accounts are located.

11. A non-transitory computer-readable medium storing instructions for importing a batch of receivers accounts onto an application platform, the instructions, when executed by one or more processors, causing the one or more processors to perform operations, comprising:

receiving, at an import receiver account options screen on a graphical user interface of the application platform, a selection to import a receiver file, wherein the receiver file comprises a listing of a plurality of receiver accounts;

determining, subsequent to the receiving, that at least a subset of the plurality of receiver accounts are invalid;

isolating, based on the determining, the subset of the plurality of receiver accounts that are invalid from a remainder of the plurality of receiver accounts that are valid;

presenting, on an imported receiver account results page of the application platform, an indication of the subset of the plurality of receiver accounts that are invalid;

displaying, on the imported receiver account results page, a deficient receiver account download icon;

downloading, upon detecting selection input provided to the deficient receiver account download icon, data associated with each of the subset of the plurality of receiver accounts;

providing the downloaded data in an editable document;

receiving, at the import receiver account options screen on the graphical user interface, another selection to import the editable document containing user edits to portions of the downloaded data for each of the subset of the plurality of receiver accounts;

determining that the subset of the plurality of receiver accounts containing the user edits in the imported editable document are valid; and updating, responsive to the determining, a receiver accounts record with the subset of the plurality of receiver accounts containing the user edits.

12. The non-transitory computer-readable medium of claim 11, further comprising:

determining, subsequent to the receiving and using a processor associated with a real-time transaction system, whether the receiver file is in a predetermined file format; and automatically converting the receiver file to the predetermined file format responsive to determining that the receiver file is not in the predetermined file format.

13. The non-transitory computer-readable medium of claim 11, wherein the determining comprises:

identifying, via analysis of the receiver file, one or more data points associated with each of the plurality of receiver accounts in the listing;

accessing, via communication with another financial entity associated with at least one of the one or more data points, a storage database;

comparing the identified one or more data points against one or more other data points in the storage database; and ascertaining, based on determining that a discrepancy exists between the identified one or more data points and the one or more other data points, that an error exists in the one or more data points.

14. The non-transitory computer-readable medium of claim 11, wherein the presenting the indication comprises displaying, within an import status table on the imported receiver account results page, a deficient accounts table comprising information that identifies: a row location in the receiver file where each of the subset of the plurality of receiver accounts are located, a beneficiary associated with each of the subset of the plurality of receiver accounts, and an error description associated with each of the subset of the plurality of receiver accounts.

15. The non-transitory computer-readable medium of claim 11, wherein the presenting the indication comprises displaying, on the imported receiver account results page, a duplicate accounts table that identifies a row location in the receiver file where of one or more duplicate accounts are located.

* * * * *